United States Patent
Berezin et al.

(10) Patent No.: US 10,371,455 B2
(45) Date of Patent: Aug. 6, 2019

(54) COOLING SYSTEM FOR ROTOR BLADE ACTUATORS

(71) Applicant: Sikorsky Aircraft Corporation, Stratford, CT (US)

(72) Inventors: Charles R. Berezin, Trumbull, CT (US); Christopher M. Sutton, Milford, CT (US); William A. Welsh, North Haven, CT (US); Shyam Neerarambam, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 198 days.

(21) Appl. No.: 15/646,527

(22) Filed: Jul. 11, 2017

(65) Prior Publication Data

US 2019/0017750 A1    Jan. 17, 2019

(51) Int. Cl.

| F28D 15/02 | (2006.01) |
| B64C 27/10 | (2006.01) |
| B64C 27/72 | (2006.01) |
| B64C 27/59 | (2006.01) |
| B64D 29/00 | (2006.01) |
| F28D 21/00 | (2006.01) |

(52) U.S. Cl.
CPC .......... *F28D 15/0275* (2013.01); *B64C 27/10* (2013.01); *B64C 27/59* (2013.01); *B64C 27/72* (2013.01); *B64D 29/00* (2013.01); *F28D 15/025* (2013.01); *F28D 15/0266* (2013.01); *B64C 2027/7205* (2013.01); *F28D 2021/0021* (2013.01)

(58) Field of Classification Search
None
See application file for complete search history.

(56) References Cited

U.S. PATENT DOCUMENTS

| 3,961,866 | A | * | 6/1976 | Nichols | ..................... | F03G 7/04 |
| | | | | | | 417/379 |
| 4,379,678 | A | * | 4/1983 | Carlock | .................. | B64C 27/54 |
| | | | | | | 416/158 |
| 4,946,354 | A | * | 8/1990 | Aubry | ..................... | B64C 27/54 |
| | | | | | | 416/157 A |
| 8,235,667 | B2 | | 8/2012 | Waide et al. | | |
| 8,950,699 | B1 | * | 2/2015 | van der Westhuizen | ..................... | |
| | | | | | | B64C 27/48 |
| | | | | | | 244/17.11 |
| 9,090,343 | B2 | | 7/2015 | Scott | | |
| 10,082,079 | B2 | * | 9/2018 | Todorovic | ................. | F02K 1/54 |

(Continued)

*Primary Examiner* — Michael Lebentritt
(74) *Attorney, Agent, or Firm* — Cantor Colburn LLP (57) ABSTRACT

A rotor system including a rotor hub, and a plurality of rotor blades. Each of the plurality of rotor blades includes a hub end. A plurality of rotor blade actuators is operatively connected to the hub end of a corresponding one of the plurality of rotor blades. A fairing is mounted to the rotor hub. The fairing includes an external surface and an internal surface defining an interior portion. The hub end and rotor blade actuator of each of the plurality of rotor blades is arranged in the interior portion. A cooling system is arranged in the interior portion. The cooling system includes a first heat exchanger thermally connected to each of the plurality of rotor blade actuators, a second heat exchanger mounted to the fairing, and at least one fluid conduit extending therebetween.

15 Claims, 6 Drawing Sheets

(56) References Cited

U.S. PATENT DOCUMENTS

| | | | | |
|---|---|---|---|---|
| 2005/0045762 | A1* | 3/2005 | Pham | B64C 27/26 |
| | | | | 244/7 R |
| 2005/0242233 | A1* | 11/2005 | Battisti | F03D 80/40 |
| | | | | 244/58 |
| 2007/0018516 | A1* | 1/2007 | Pal | F04D 25/082 |
| | | | | 310/61 |
| 2011/0268563 | A1* | 11/2011 | Stretton | F01D 25/12 |
| | | | | 415/179 |
| 2014/0175919 | A1* | 6/2014 | Miyamoto | H02K 9/04 |
| | | | | 310/54 |
| 2015/0096300 | A1* | 4/2015 | Gurin | F01K 23/10 |
| | | | | 60/645 |
| 2016/0003149 | A1* | 1/2016 | Suciu | F02C 7/06 |
| | | | | 60/772 |
| 2016/0195017 | A1* | 7/2016 | Vick | F02C 7/08 |
| | | | | 60/39.511 |
| 2017/0210480 | A1* | 7/2017 | Lauder | B64D 27/24 |

* cited by examiner

COOLING SYSTEM FOR ROTOR BLADE ACTUATORS

BACKGROUND

Exemplary embodiments pertain to the art of rotary wing aircraft and, more particularly, to a cooling system for rotor blade actuators for a rotary wing aircraft.

Rotary wing aircraft include rotor blades that are selectively rotated about a rotor blade axis to adjust flight characteristics. Typically, each rotor blade of a rotor system is connected to a rotor blade actuator which, in turn, may be coupled to a vehicle management system and/or control inceptors. In some cases, rotor blade actuators may be exposed to an airstream passing over or around a rotor hub. In other cases, the rotor blade actuators may be surrounded in a fairing. The fairing reduces drag on the rotor blades. The fairing also reduces airflow across the actuators which, in turn, can have a detrimental effect on cooling.

BRIEF DESCRIPTION

Disclosed is a rotor system including a rotor hub, and a plurality of rotor blades supported by the rotor hub. Each of the plurality of rotor blades includes a hub end. A plurality of rotor blade actuators is operatively connected to the hub end of a corresponding one of the plurality of rotor blades such that each rotor blade is individually actuated about an axis. A fairing is mounted to the rotor hub. The fairing includes an external surface exposed to an external airflow and an internal surface defining an interior portion. The hub end and rotor blade actuator of each of the plurality of rotor blades is arranged in the interior portion and the blades extending out through the fairing. A cooling system is arranged in the interior portion. The cooling system includes a first heat exchanger thermally connected to each of the plurality of rotor blade actuators, a second heat exchanger mounted to the fairing, and at least one fluid conduit extending therebetween so as to remove heat generated by each rotor blade actuator to the external airflow at the exterior of the fairing.

In addition to one or more of the features described above or below, or as an alternative, further embodiments could include wherein the second heat exchanger includes a surface portion exposed at the external surface of the fairing.

In addition to one or more of the features described above or below, or as an alternative, further embodiments could include wherein the fairing includes an upper portion and a lower portion, the second heat exchanger being arranged at the lower portion.

In addition to one or more of the features described above or below, or as an alternative, further embodiments could include wherein the fairing includes an upper portion and a lower portion, the second heat exchanger being arranged at the upper portion.

In addition to one or more of the features described above or below, or as an alternative, further embodiments could include wherein the at least one fluid conduit comprises a heat pipe.

In addition to one or more of the features described above or below, or as an alternative, further embodiments could include a fluid arranged in the cooling system.

In addition to one or more of the features described above or below, or as an alternative, further embodiments could include wherein the at least one fluid conduit includes a first fluid conduit delivering fluid from the second heat exchanger to the first heat exchanger and a second fluid conduit delivering fluid from the first heat exchanger to the second heat exchanger.

In addition to one or more of the features described above or below, or as an alternative, further embodiments could include a pump fluidically connected to the second fluid conduit.

In addition to one or more of the features described above or below, or as an alternative, further embodiments could include wherein the second heat exchanger extends about at least a portion of the fairing, wherein the first heat exchanger of each rotor blade actuator is fluidically connected to the second heat exchanger.

Also disclosed is a method of cooling a rotor blade actuator operatively connected to a hub end of each of a plurality of rotor blades, the method including promoting a heat exchange between a cooling fluid in a first heat exchanger and the rotor blade actuator, passing the cooling fluid to a second heat exchanger arranged on a fairing surrounding the hub end of each of the plurality of rotor blades, and promoting a heat exchange between the cooling fluid in the second heat exchanger and ambient fluids in contact with an external surface of the second heat exchanger.

In addition to one or more of the features described above or below, or as an alternative, further embodiments could include wherein passing the cooling fluid to the second heat exchanger includes passing the cooling fluid through a heat pipe.

In addition to one or more of the features described above or below, or as an alternative, further embodiments could include wherein passing the cooling fluid to the second heat exchanger includes passing the cooling fluid to an annular heat exchanger having a surface externally exposed on the fairing.

In addition to one or more of the features described above or below, or as an alternative, further embodiments could include passing the cooling fluid from the second heat exchanger back to the first heat exchanger.

In addition to one or more of the features described above or below, or as an alternative, further embodiments could include wherein passing the cooling fluid back to the first heat exchanger includes pumping the cooling fluid back to the first heat exchanger.

In addition to one or more of the features described above or below, or as an alternative, further embodiments could include wherein passing the cooling fluid back to the first heat exchanger includes guiding the cooling fluid with one of a centrifugal force and a gravitational force.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
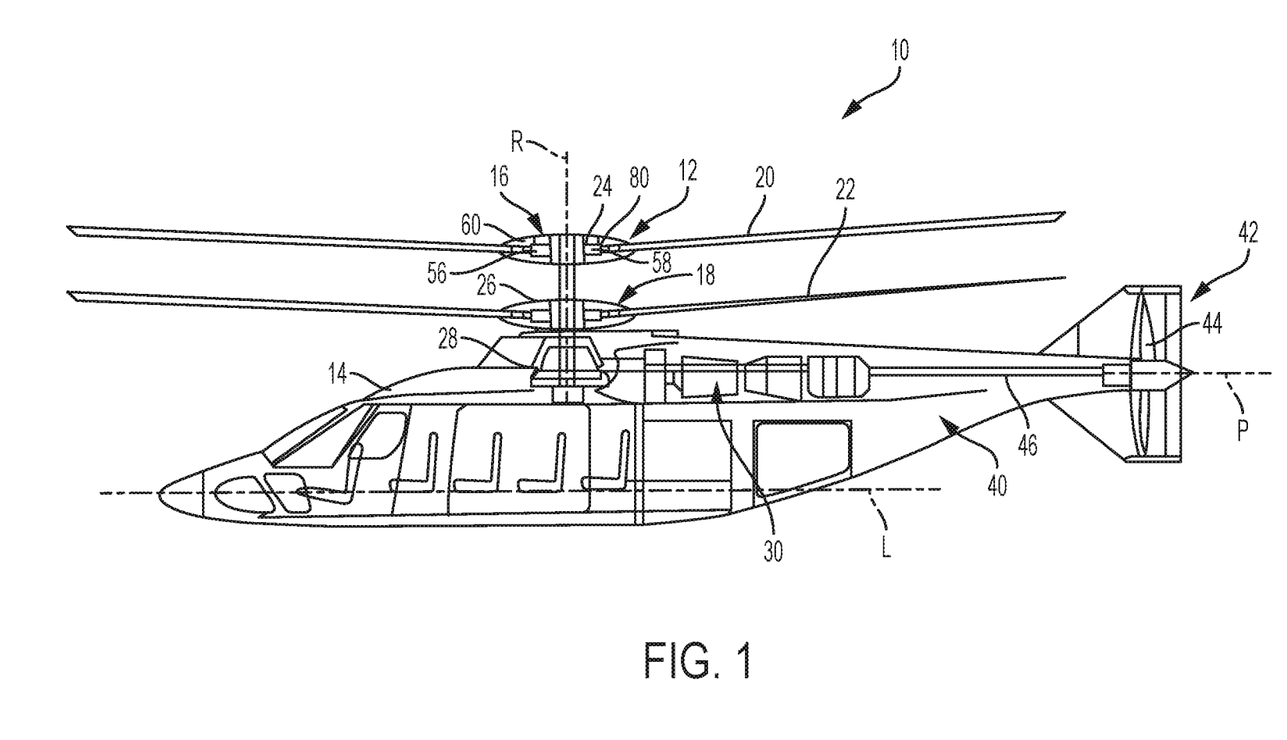
FIG. 1 depicts a vertical takeoff and landing (VTOL) aircraft including a rotor blade actuator cooling system, in accordance with an exemplary embodiment.

FIG. 1 depicts a vertical takeoff and landing (VTOL) aircraft 10 including a dual, contra-rotating main rotor system 12, which rotates about a main rotor axis R. Aircraft 10 includes an airframe 14 which supports dual, contra-rotating main rotor system 12. Dual, contra-rotating main rotor system 12 includes a first rotor system 16 and a second rotor system 18. First rotor system 16 includes a first plurality of rotor blades 20 and second rotor system 18 includes a second plurality of rotor blades 22. First plurality of rotor blades 20 are mounted to a first rotor hub 24 and second plurality of rotor blades 22 are mounted to a second rotor hub 26. Dual, contra-rotating main rotor system 12 is driven by a gear box 28 coupled to one or more prime movers, indicated generally at 30. It should be understood that VTOL aircraft 10 may also be configured with a single rotor system or any other rotor system having an enclosed hub and electronic actuators.

Aircraft 10 includes an extending tail 40 that supports a translational thrust system 42 including a pusher propeller 44 that rotates about a pusher propeller axis P. Translational thrust system 42 may be operatively coupled to gear box 28 through a drive shaft 46. Translational thrust system 42 provides thrust along an aircraft longitudinal axis L. It is to be understood that translational thrust system 42 may take on a variety of forms including those providing yaw control. Additionally, it should be noted that translational thrust system 42 may be any propeller system including a tractor propeller, a nacelle mounted propeller, a wing mounted propeller, and the like.

Figure 2:
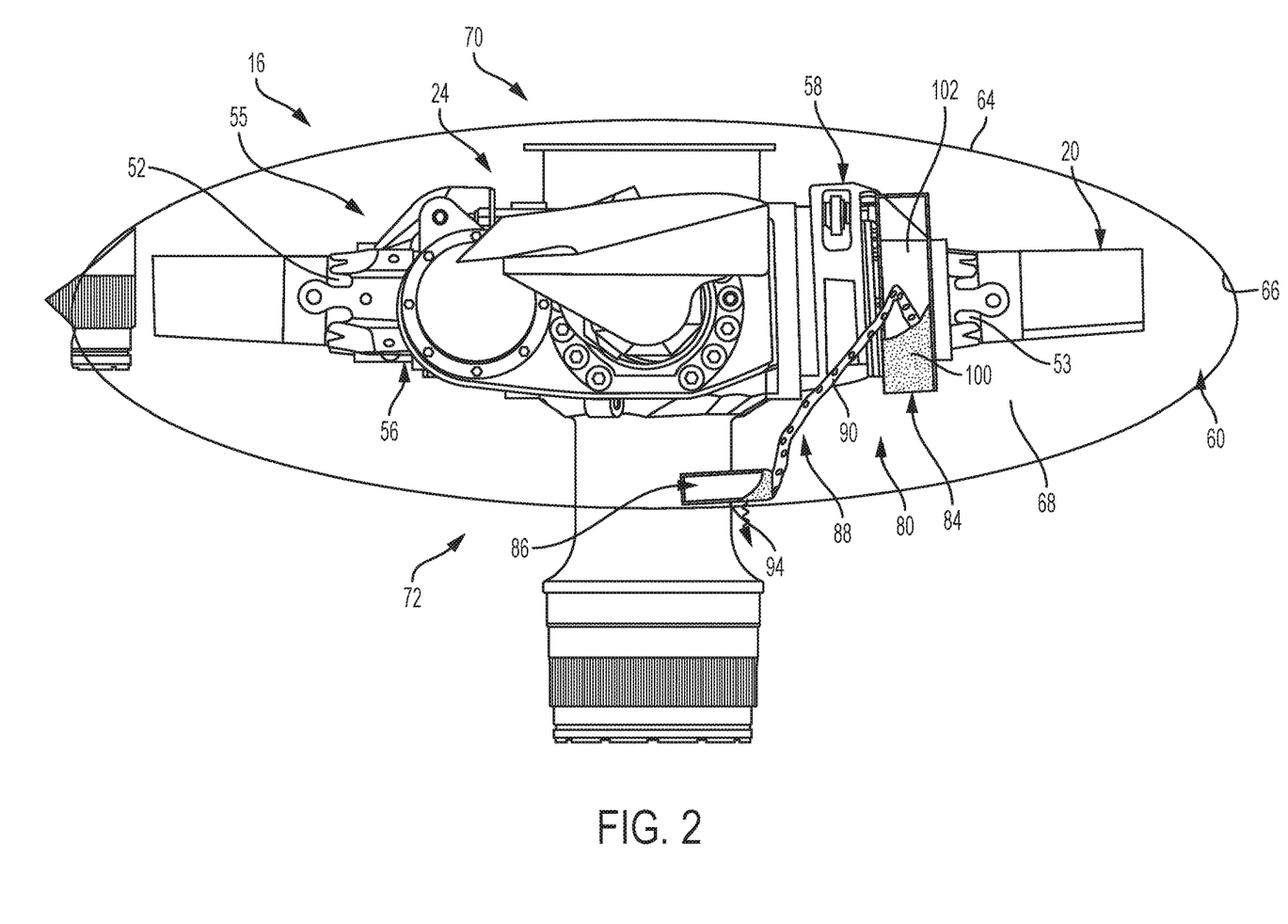
FIG. 2 depicts the rotor blade actuator cooling system, in accordance with an exemplary embodiment.

Reference will now follow to FIG. 2, and with continued reference to FIG. 1 in describing first rotor system 16 with an understanding that second rotor system 18 may include similar components. Each of the plurality of rotor blades 20, 22 includes a hub end, two of which are indicated at 52 and 53 connected to first rotor hub 24. A plurality of rotor blade actuators 55 are mechanically connected to each of the plurality of rotor blades 20, 22. For example, a first rotor blade actuator 56 is mechanically connected with hub end 52 and a second rotor blade actuator 58 is mechanically coupled with hub end 53. It is to be understood that each of the plurality of rotor blades 20, 22 includes a corresponding rotor hub actuator so as to define an individual blade control (IBC) system for aircraft 10. A fairing 60 surrounds first rotor hub 24.

Fairing 60 includes an external surface 64 and an internal surface 66 that defines an interior portion 68. Fairing 60 also includes an upper portion 70 and a lower portion 72. Each rotor blade actuator 56, 58, as well as additional rotor blade actuators (not shown) are housed within interior portion 68. As external surface 64 of fairing 60 is substantially continuous, a cooling system 80 is provided to reduce operating temperatures of each of the plurality of rotor blade actuators 55.

Reference will continue to FIG. 2 in describing cooling system 80 associated with second rotor blade actuator 58. It is to be understood that cooling system 80 includes cooling components associated with each of the plurality of rotor blade actuators 55. Cooling system 80 includes a first heat exchanger 84 thermally connected to second rotor blade actuator 58, a second heat exchanger 86 thermally connected to fairing 60, and a fluid conduit 88 extending therebetween. Second heat exchanger 86 may be arranged close to an axis of rotation of rotor system 16. In an embodiment, second heat exchanger 86 is arranged inboard of each rotor blade actuator 56, 58.

In accordance with an exemplary aspect, fluid conduit 88 fluidically connects first heat exchanger 84 with second heat exchanger 86. In an embodiment, fluid conduit 88 may take the form of a heat pipe 90. The term "heat pipe" should be understood to describe a heat transfer device that combines thermal conductivity principles and phase transition principles to manage a transfer of heat between two bodies. Fluid conduit 88 may take on other forms as well.

Figure 3:
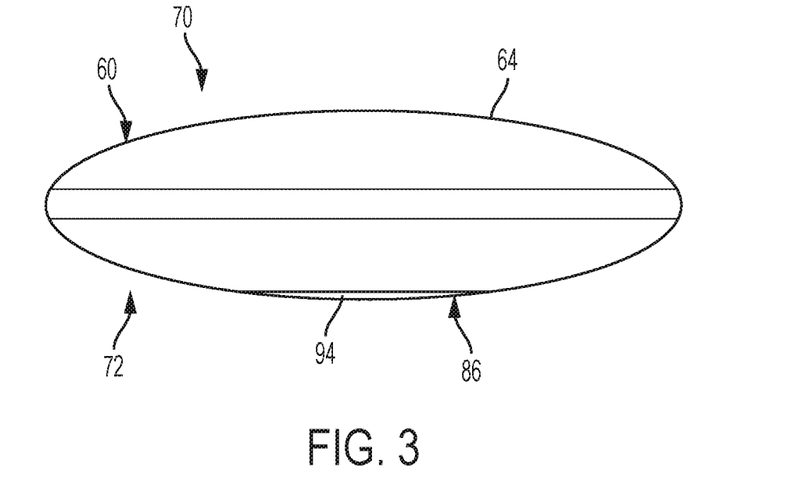
FIG. 3 depicts a side view of a fairing surrounding the rotor blade actuator cooling system, in accordance with an aspect of an exemplary embodiment.
Figure 4:
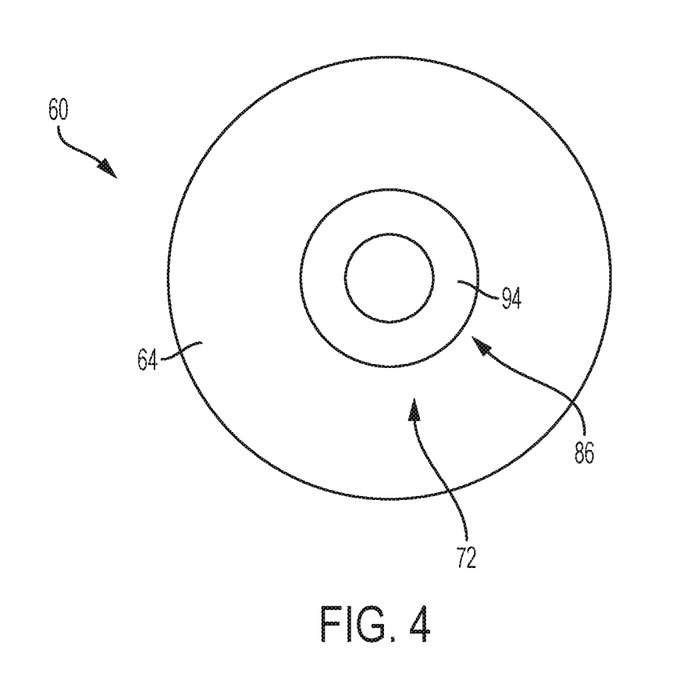
FIG. 4 depicts a bottom view of the fairing of FIG. 3, in accordance with an aspect of an exemplary embodiment.

Second heat exchanger 86 includes an external surface portion 94 that is exposed at external surface 64 of fairing 60. In an embodiment, each second heat exchanger 86 is a discrete element associated with a corresponding one of the plurality of rotor blade actuators 55. In another embodiment, second heat exchanger 86 may be associated with each of the plurality of rotor blade actuators 55. As shown in FIGS. 3 and 4, second heat exchanger 86 may be an annular member (not separately labeled) with external surface portion 94 being substantially continuous and extending about lower portion 72 of fairing 60. It is to be understood that the particular arrangement, configuration and position of second heat exchanger 86 may vary as discussed herein.

Figure 5:
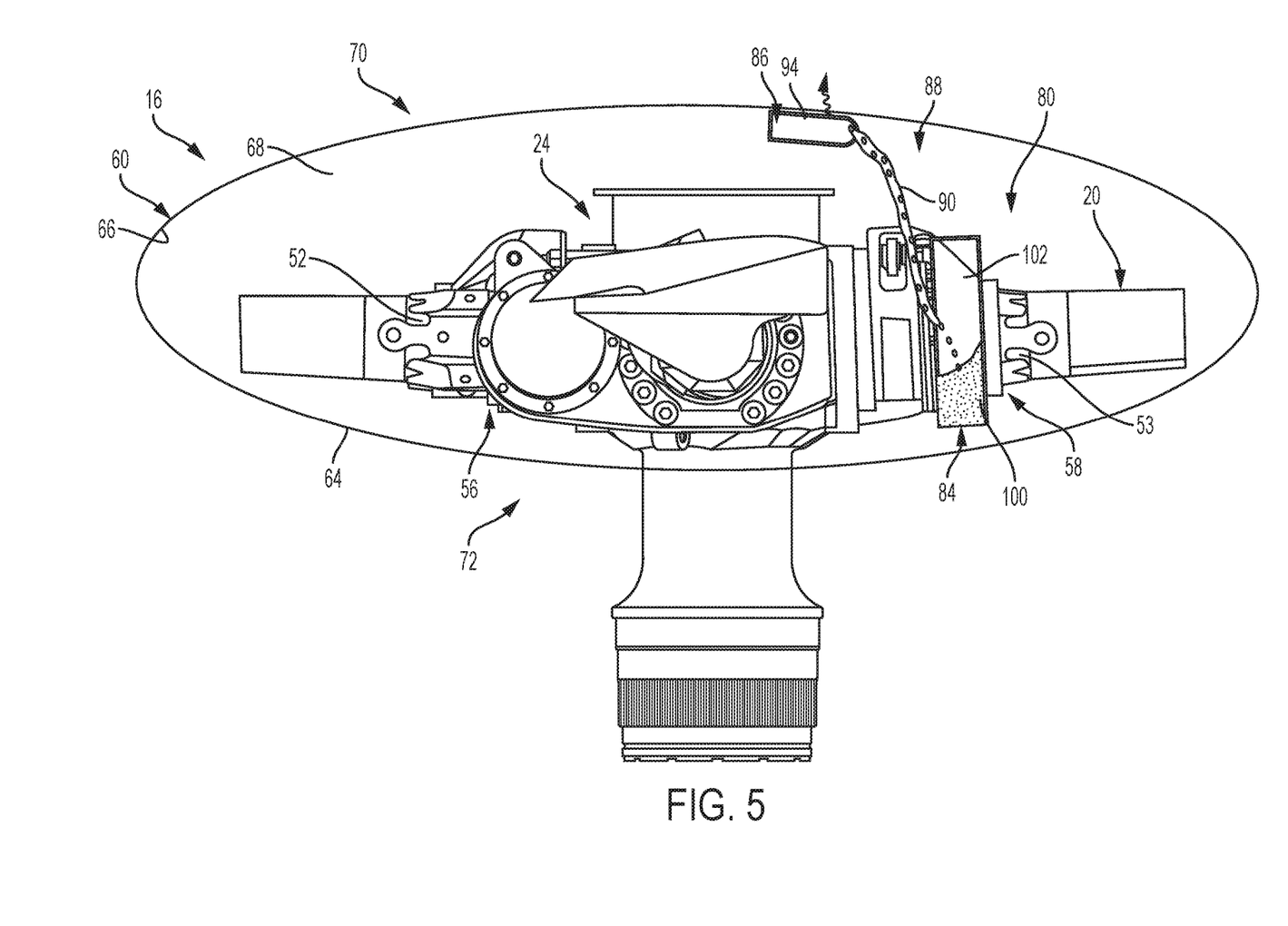
FIG. 5 depicts the rotor blade actuator cooling system, in accordance with another aspect of an exemplary embodiment.
Figure 6:
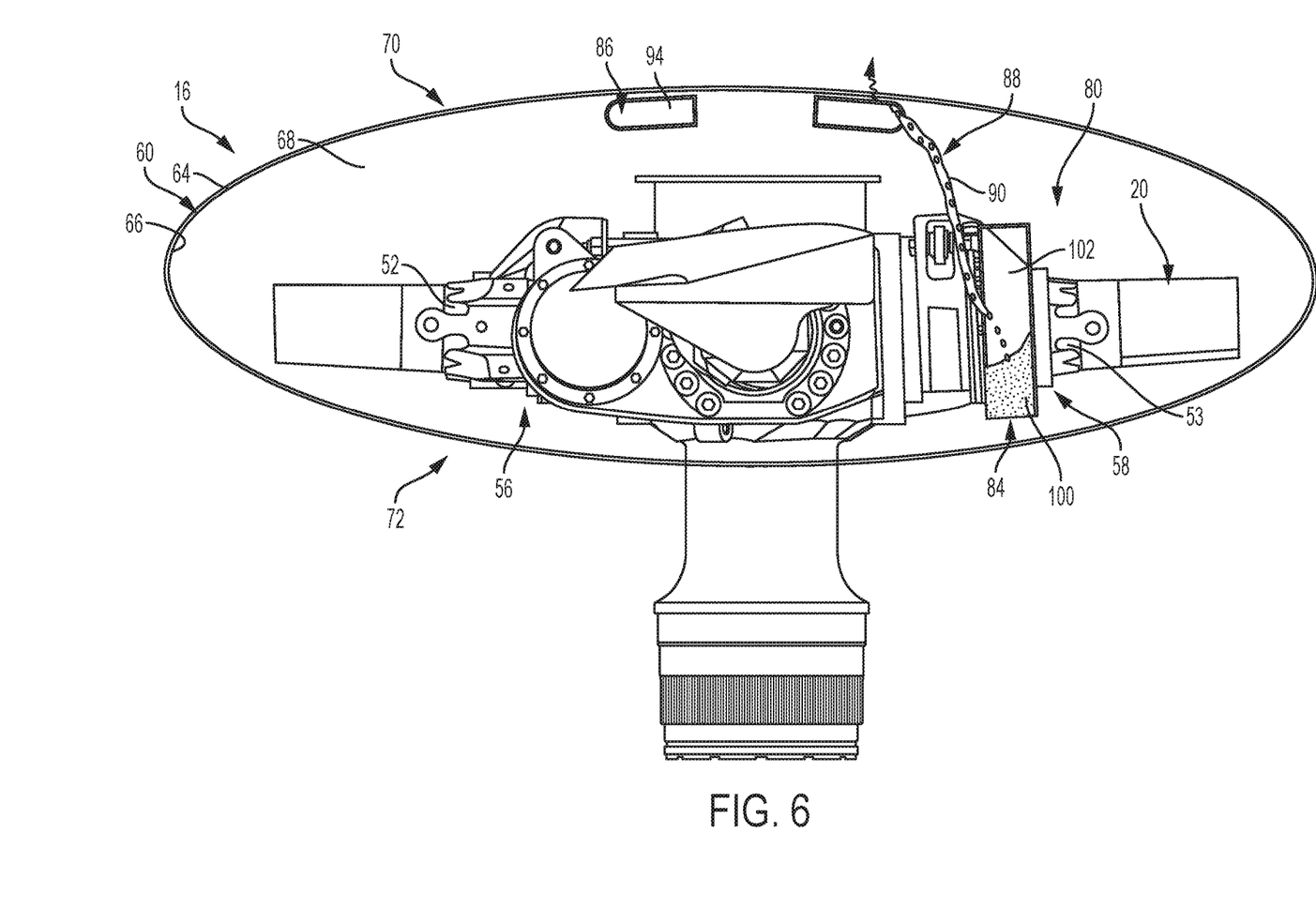
FIG. 6 depicts the rotor blade actuator cooling system, in accordance with yet another aspect of an exemplary embodiment.

As shown in FIG. 5, wherein like reference numbers represent corresponding parts in the respective views, second heat exchanger 86 may be arranged such that external surface portion 94 is exposed at upper portion 70 of fairing 60. That is, second heat exchanger 86 may take the form of discrete heat exchangers arranged at upper portion 70 of fairing 60. In FIG. 6, wherein like reference numbers represent corresponding parts in the respective views, second heat exchanger 86 is depicted as an annular member that is fluidically connected to each of the plurality of rotor blade actuators 55 through a corresponding fluid conduit 88. It should also be understood that cooling system 80 may include a second heat exchanger 86 at lower portion 72 of fairing 60 and another second heat exchanger 86 at upper portion 70 of fairing 60.

In operation, a cooling fluid 100, which may be in the form of a liquid is forced from second heat exchanger 86 to first heat exchanger 84. In an embodiment, cooling fluid 100 may be forced through centrifugal force developed through rotation of the first plurality of rotor blades 20. In another embodiment, the cooling fluid 100 may be forced from second heat exchanger 86 to first heat exchanger 84 by gravity. If by gravity, cooling system 80 may be operable without rotation of the plurality of rotor blades 20 such as during ground maintenance or prior to spin up.

Cooling fluid 100 exchanges heat with second rotor blade actuator 58 and may transform into a vapor 102. Vapor 102 returns through, for example, centrifugal force developed by rotation of rotor system 16. It should be understood that in addition to, or as an alternative to centrifugal force, vapor 102 may be retried through a capillary action along heat pipe 90 to second heat exchanger 86. It should be further understood that heat pipe 90 may also take the form of a thermosiphon. Further, it is to be understood that vapor 102 may return under a gravitational force In second heat exchanger 86, vapor 102 transforms back to a liquid through a heat exchange with ambient and is passed back to first heat exchanger 84. In this manner, cooling system 80 may reduce localized temperatures at each of the plurality of rotor blades 20 without the need to create openings in fairing 60 which could create undesirable drag. Further, the above described system provides a closed loop cooling system that does not require electrical connections or external power to guide cooling fluid between two heat exchangers.

Figure 7:
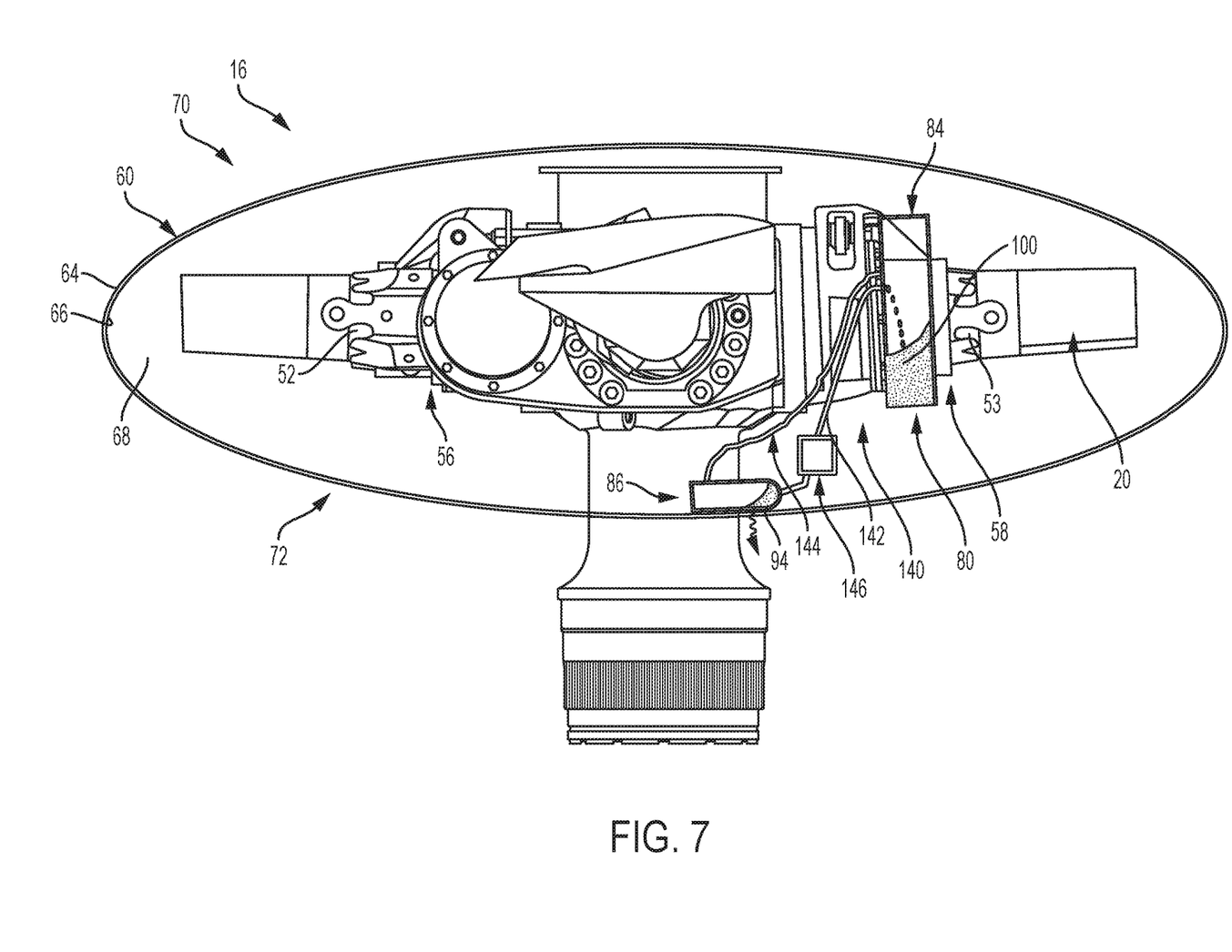
FIG. 7 depicts the rotor blade actuator cooling system, in accordance with still yet another aspect of an exemplary embodiment.

Reference will now follow to FIG. 7, wherein like reference numbers represent corresponding parts in the respective views, in describing a fluid conduit 140 in accordance with another aspect of an exemplary embodiment. Fluid conduit 140 includes a first conduit member 142 that extends between and fluidically connected first heat exchanger 84 and second heat exchanger 86 and a second conduit member 144 that extends between and fluidically connects first heat exchanger 84 and second heat exchanger 86. Second conduit member 144 delivers cooling fluid 100, which may be in the form of a liquid or a vapor from first heat exchanger 84 to second heat exchanger 86. First conduit member 142 delivers cooling fluid 100, which may be in the form of a liquid from first heat exchanger 84 to second heat exchanger 86. In order to promote movement of cooling fluid 100, cooling system 80 includes a pump 146 fluidically connected with first conduit member 142. In this configuration, pump 146 operates to transfer cooling fluid 100 from second heat exchanger 86 back to first heat exchanger 84.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor system comprising:
   a rotor hub;
   a plurality of rotor blades supported by the rotor hub, each of the plurality of rotor blades including a hub end;
   a plurality of rotor blade actuators, each rotor blade actuator being operatively connected to the hub end of a corresponding one of the plurality of rotor blades such that each rotor blade is individually actuated about an axis;
   a fairing mounted to the rotor hub, the fairing including an external surface exposed to an external airflow and an internal surface defining an interior portion, the hub end and rotor blade actuator of each of the plurality of rotor blades being arranged in the interior portion and the blades extending out through the fairing; and
   a cooling system arranged in the interior portion, the cooling system including a first heat exchanger thermally connected to each of the plurality of rotor blade actuators, a second heat exchanger mounted to the fairing, and at least one fluid conduit extending therebetween so as to remove heat generated by each rotor blade actuator to the external airflow at the exterior of the fairing.

2. The rotor system according to claim 1, wherein the second heat exchanger includes a surface portion exposed at the external surface of the fairing.

3. The rotor system according to claim 2, wherein the fairing includes an upper portion and a lower portion, the second heat exchanger being arranged at the lower portion.

4. The rotor system according to claim 2, wherein the fairing includes an upper portion and a lower portion, the second heat exchanger being arranged at the upper portion.

5. The rotor system according to claim 1, wherein the at least one fluid conduit comprises a heat pipe.

6. The rotor system according to claim 1, further comprising: a fluid arranged in the cooling system.

7. The rotor system according to claim 1, wherein the at least one fluid conduit includes a first fluid conduit delivering fluid from the second heat exchanger to the first heat exchanger and a second fluid conduit delivering fluid from the first heat exchanger to the second heat exchanger.

8. The rotor system according to claim 7, further comprising: a pump fluidically connected to the second fluid conduit.

9. The rotor system according to claim 1, wherein the second heat exchanger extends about at least a portion of the fairing, wherein the first heat exchanger of each rotor blade actuator is fluidically connected to the second heat exchanger.

10. A method of cooling a rotor blade actuator operatively connected to a hub end of each of a plurality of rotor blades, the method comprising:
    promoting a heat exchange between a cooling fluid in a first heat exchanger and the rotor blade actuator;
    passing the cooling fluid to a second heat exchanger arranged on a fairing surrounding the hub end of each of the plurality of rotor blades; and
    promoting a heat exchange between the cooling fluid in the second heat exchanger and ambient fluids in contact with an external surface of the second heat exchanger.

11. The method of claim 10, wherein passing the cooling fluid to the second heat exchanger includes passing the cooling fluid through a heat pipe.

12. The method of claim 10, wherein passing the cooling fluid to the second heat exchanger includes passing the cooling fluid to an annular heat exchanger having a surface externally exposed on the fairing.

13. The method of claim 10, further comprising: passing the cooling fluid from the second heat exchanger back to the first heat exchanger.

14. The method of claim 13, wherein passing the cooling fluid back to the first heat exchanger includes pumping the cooling fluid back to the first heat exchanger.

15. The method of claim 13, wherein passing the cooling fluid back to the first heat exchanger includes guiding the cooling fluid with one of a centrifugal force and a gravitational force.

* * * * *